United States Patent [19]

Shin

[11] Patent Number: 6,097,710
[45] Date of Patent: Aug. 1, 2000

[54] METHOD FOR DETECTING STRENGTH OF RECEIVING SIGNALS OF USERS IN A CODE DIVISION MULTIPLE ACCESS SYSTEM

[75] Inventor: Sung Moon Shin, Daejon-shi, Rep. of Korea

[73] Assignees: Electronics and Telecommunications Research Institute, Taejon; Dacom Corporation, Seoul, both of Rep. of Korea

[21] Appl. No.: 08/958,011

[22] Filed: Oct. 27, 1997

[30] Foreign Application Priority Data

Oct. 29, 1996 [KR] Rep. of Korea ...................... 96-49512

[51] Int. Cl.[7] .......................... H04Q 7/00; H04B 7/216; H04B 7/00
[52] U.S. Cl. .......................... 370/332; 370/342; 455/522
[58] Field of Search ...................................... 370/252, 332, 370/335, 328, 342, 441; 455/513, 522, 516, 422, 436–439, 69; 375/200

[56] References Cited

U.S. PATENT DOCUMENTS

| | | | |
|---|---|---|---|
| 5,345,598 | 9/1994 | Dent | 455/522 |
| 5,697,056 | 12/1997 | Tayloe | 455/513 |
| 5,703,902 | 12/1997 | Ziv et al. | 370/322 |
| 5,835,847 | 11/1998 | Gilmore et al. | 455/12.1 |
| 5,878,329 | 3/1999 | Mallinckrodt | 455/69 |
| 5,933,777 | 8/1999 | Rahman | 370/342 |

*Primary Examiner*—Hassan Kizou
*Assistant Examiner*—Afsar M. Qureshi
*Attorney, Agent, or Firm*—Cohen, Pontani, Lieberman & Pavane

[57] ABSTRACT

A method for detecting a strength of received signals of users in a code division multiple access system, which can upgrade a service quality for users and improve system performance by detecting strength of received signals in a code division multiple access system is disclosed. The apparatus comprises a radio frequency (RF) processor for receiving a high frequency power signal. A received power measuring device is connected to the radio frequency processor for measuring the strength of the power received from, the radio frequency processor. A correlator device is then connected to the received power measuring device for detecting a digital signal from the modulated signal of the received power measuring device. A channel processor device is provided for decoding the detected digital signal into an original digital signal in line with channels. A base station controller is connected to both the measuring device controller and the channel processor device for managing and controlling the channel processor. A measuring device controller is then connected to the received power measuring device for detecting the operational state of the system and the strength of the received signal by associating them each other in accordance with the strength of the power measured from the received power measuring device.

2 Claims, 2 Drawing Sheets

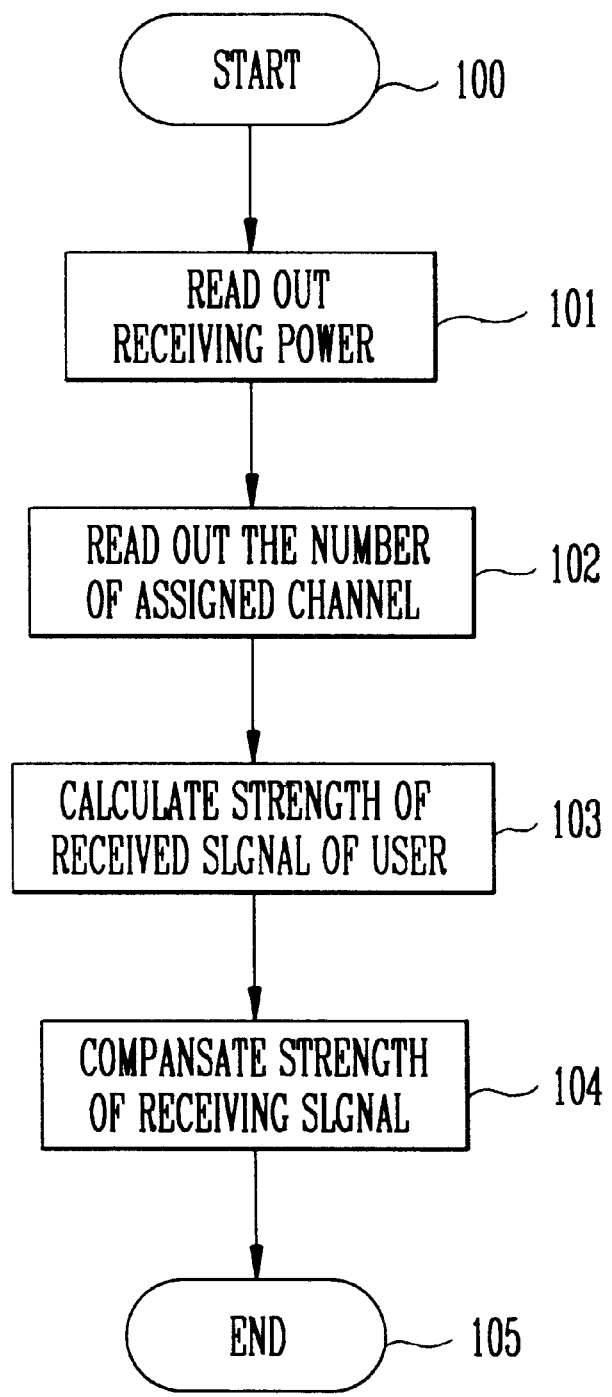

METHOD FOR DETECTING STRENGTH OF RECEIVING SIGNALS OF USERS IN A CODE DIVISION MULTIPLE ACCESS SYSTEM

BACKGROUND OF THE INVENTION

1. Field of the Invention

The present invention relates to a method for detecting strength of receiving signals of users in a code division multiple access(CDMA) system, and more particularly, to a method for detecting strength of received signals of users in a code division multiple access system, which can upgrade a service quality for users and improve system performance by detecting strength of received signals received from a base station in a code division multiple access cellular system.

2. Description of the Related Art

In general, a method for detecting strength of received signals of users in a code division multiple access system is one of the important technologies required for analyzing and testing signal characteristics in a code division multiple access system. However, no effective method for detecting strength of received signals of users in a code division multiple access system has been proposed even in any of industrially advanced nations as of today. Hence, a need exists in the art for an improved method for detecting strength of received signals in a code division multiple access system.

In the code division multiple access system using a Spread Spectrum(SS), the capacity of radio links varies depending upon interference amounts contained in the radio links even in the same bandwidth as opposed to a frequency division multiple access(FDMA) system or a time division multiple access(TDMA) system. Generally, the capacity of the backward link(i.e., radio link from the terminal to the base station) is smaller than that of the forward link(i.e., radio link from the base station to the terminal), the capacity of the radio links for the code division multiple access system is determined in accordance with the capacity of the backward link. For example, assuming that if the service quality can be represented as Signal-to-Noise(S/N) rate(Eb/No) and the rate value is 7 dB the capacity(N) of the radio links for the code division multiple access system according to IS-95 in which the bandwidth is 1.2288 MHz and the signal speed processed by one user can be expressed by the equation (1) as follow:

$$N = \frac{1.2288 \, M / 9.6 \, k}{5(7dB)} \approx 25 \quad (1)$$

However, the actual capacity of the radio links for the code division multiple access system is affected by various factors, i.e., voice activity, background noise and sectorization effect and so on in addition to the above factors. Especially, the interference received at the base station is arrived from not only the user's cell but also the external user'cell, and this interference amounts from external cell is varied depending on the external conditions, i.e., the radio propagating characteristics and the size of the hand-off area, etc. If the interference amounts from the external decrease, the actual capacity of the radio links for the code division multiple access cellular system increases. In contrast to the above, if the interference amounts from the external increases, the actual capacity of the radio links for the code division multiple access cellular system decreases. Therefore, in the code division multiple access cellular system, the signal power received from the users is strictly controlled in order to increase the capacity of the radio links. Consequently, to detect and analyze the receiving signals from the users is an important role in increasing the capacity of the code division multiple access cellular system.

However, no method has been proposed to immediately detect the received signals transferred from the users,till now. The measurements of the service quality is being made only using a bit error rate of the receiving signals. In the system where the receiving power of the users is controlled, a bit error rate of the received signals remain almost uniform. If a bit error rate of the receiving signals is uniform, strength of the received signals to total interference amounts rate also become uniform. Thus, there is a problem that the presently used measurements of the bit error rate of the received signals can test the performance of the power controlled system only in part and can not be applied to test the characteristics and performance associated with the individual users including the radio links. Further, there is a drawback that the performance of the entire system cannot be tested.

It is therefore an object of the invention to provide a method for detecting strength of received signals of users in a code division multiple access system, which can upgrade a service quality for users and improve system performance by detecting the received signal strength in a code division multiple access system.

SUMMARY OF THE INVENTION

For the purpose of summarizing the present invention, the method for detecting strength of the received user signal in a code division multiple access system according to the present invention is provided which utilizes the step of reading out the strength of the received power at a short period of the channel requiring period at the measuring device controller. The number of channels assigned by a present base station read out from the base station controller. The strength of the received signal is calculated using received signal strength read out and the number of the channels assigned at the present base station. The strength of the received signal is compensated with consideration of the user condition and the power control performance of the calculated strength of the received signal.

According to the present invention, it has superior advantageous effects that the test of the service quality for users and the channel characteristics can be easily achieved. Furthermore, the performance test and capacity of the code division multiple access system can be improved, which results in accomplishing an economical code division multiple access system.

BRIEF DESCRIPTION OF THE DRAWINGS

The present invention will become more apparent upon a detailed description of the preferred embodiments for carrying out the invention as rendered below:

FIG. 2 is a flow chart illustrating a method for detecting strength of received signals of users in a code division multiple access system according to the present invention.

Figure 1:
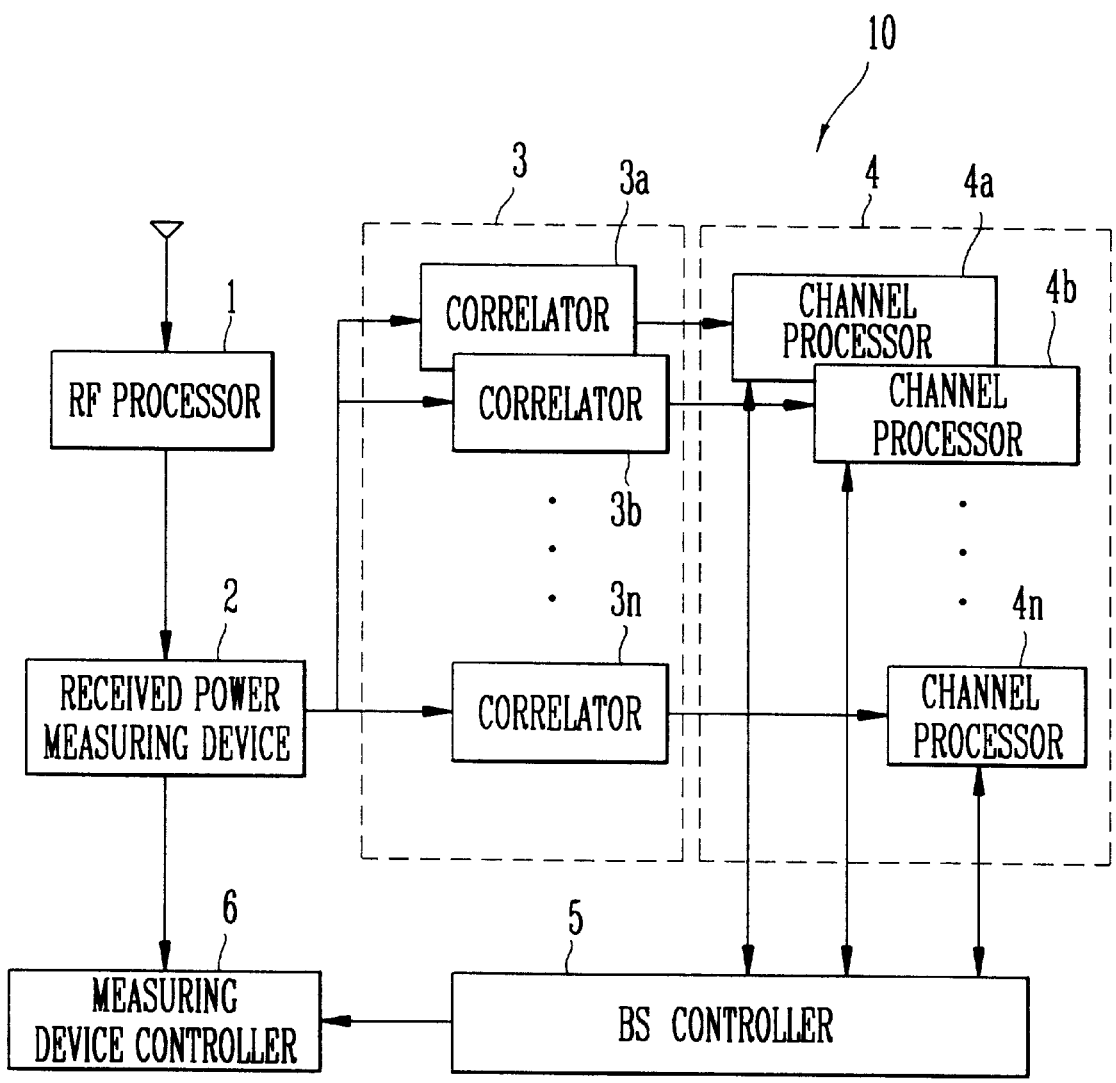
FIG. 1 is a block diagram illustrating an apparatus for detecting strength of receiving signals of users in a code division multiple access system according to the present invention.

The operation of the embodiment of the present invention as discussed above will now be described in detail.

DETAILED DESCRIPTION OF THE INVENTION

Referring now to FIG. 1, there is shown a block diagram representing an apparatus 10 for detecting strength of received signals of users in a code division multiple access system in accordance with the present invention.

In the figure, the apparatus 10 generally includes a radio frequency (RF) processor 1 for receiving a radio frequency. A received power measuring device 2 is connected to the radio frequency processor 1 for measuring the strength of the power received from the radio frequency processor 1. A measuring device controller 6 is then connected to the received power measuring device 2 for detecting the operational state of the system and the strength of the received signal by associating them each other in accordance with the strength of the power measured from the received power measuring device 2.

A correlator device 3 (or match filter) consisting of a plurality of correlators 3a, 3b, . . . 3n is connected to the received power measuring device 2 for detecting a digital signal from the modulated signal of the received power measuring device 2. A channel processor device 4 which includes a plurality of channel processors 4a, 4b, . . . 4n each connected correspondingly to the plurality of the correlators 3a, 3b, . . . 3n of the correlator device 3 is provided for decoding the demodulated digital signal into the original digital signal in line with the channels. A base station controller 5 is connected to both the measuring device controller 6 and the channel processor device 4 for managing and controlling the channel processor 4.

FIG. 2 is a flow chart illustrating the method for detecting strength of received signals of users in a code division multiple access system according to the second embodiment of the present invention where it represents the detailed operational flow of the measuring device controller 6 for detecting strength of received signals in a code division multiple access system shown in FIG. 2.

Referring now to FIG. 2, the measuring device controller 6 starts at step 100 and reads out the strength of the received power at a short period of the channel requiring period(at about 10/1 of the channel requiring period) at step 101. At step 102, it reads out the number of the channels assigned by the present base station(not shown in the drawing), from the base station controller 5. At step 103, the strength(s) of the received signal of the user is calculated using the strength of the received signal read out and the number of the channels assigned at the present base station. The equation used to the calculation above is as follow:

$$Sk = \frac{P}{C+1} \cdot \frac{(Eb/No)k}{5} \quad (2)$$

where P is a received power, C is a link capacity given to (W/R)/(Eb/No), W is a frequency band, R is an average value of signal transmit rate, Eb/No is a signal-to-noise rate and (Eb/No)k is Eb/No stored at k-th channel. In the code division multiple access system according to the present IS-95, W=1.2288 MHz, R=9.6 kbps*0.4=3.84 kbps, and (Eb/No)=5. In this case, C becomes 64.

The calculated strength of the received signal of the user is a value under the ideal power control system. Since the strength of the received signal of the user is varied depending on the position and moving speed of the user and etc., it is compensated in consideration of the user condition and the power control performance at step 104. Generally, it is obtained by producing the strength of the received signal of the user calculated at step 103 by a value obtained by dividing the signal-to-noise rate (Eb/No) by 5 stored at the channel processor. Voice-activity compensation can be also achieved at this stage.

As fully described above, according to the present invention, if the strength of received signals of users in a code division multiple access system is detected, the test of the service quality for users and the channel characteristics can easily be achieved. Further, since the strength of received signals of users in a code division multiple access system may be applied to the link analysis, design and operation, it has superior advantages that the performance test and capacity of the code division multiple access system can be improved, whereby an economical code division multiple access system can be accomplished.

The present invention has been described with reference to a particular embodiment in connection with a particular application. Those presented ordinary skill in the art and access to the teachings of the present invention will recognize additional modifications and applications within the scope thereof. It is therefore intended by the appended claims to cover any and all such applications, modifications, and embodiments within the scope of the present invention.

What is claimed is:

1. A method for detecting a strength of one of a plurality of received signals in a code division multiple access system which includes a radio frequency processor, a received power measuring device, a correlator device, a channel processor device, a base station controller and a measuring deice controller, the method comprises the steps of:

reading out the power of the plurality of received signals during a short period of a channel requesting period using said measuring device controller;

reading out a quantity of said plurality of channels assigned by a present base station using said base station controller;

calculating the strength of the one of a plurality of received signals using the read out power of the plurality of received signals and the quantity of channels assigned at the present base station; and compensating the strength of the received signal in response to conditions of a user of one of said plurality of channels and the power control performance of the calculated strength of the received signal, wherein said step of calculating the strength of the received signal of the user is calculated by using the following equation:

$$Sk = \frac{P}{c+1} \cdot \frac{(Eb/No)k}{5}$$

where P is a received power, c is a link capacity given by (W/R)/(Eb/No), W is a frequency band, R is an average value of signal transmit rate, Eb/No is a signal-to-noise rate and (Eb/No)k is Eb/No stored at k-th channel.

2. The method according to claim 1, wherein said step of reading out the strength of the plurality of received signals power is performed during approximately 10/1 of the channel requesting period.

* * * * *